United States Patent [19]

Bergström et al.

[11] Patent Number: 5,342,887
[45] Date of Patent: Aug. 30, 1994

[54] DYNAMICALLY CROSSLINKED POLYOLEFIN COMPOSITION

[75] Inventors: Christer Bergström, Espoo; Gunilla Krook, Kulloo, both of Finland

[73] Assignee: Neste Oy, Kulloo, Finland

[21] Appl. No.: 996,082

[22] Filed: Dec. 23, 1992

[30] Foreign Application Priority Data

Dec. 30, 1991 [FI] Finland .................................. 916163

[51] Int. Cl.$^5$ ........................ C08L 23/06; C08L 23/04; C08L 23/12
[52] U.S. Cl. .................................... 525/108; 525/118; 525/125; 525/130; 525/194; 525/223
[58] Field of Search ............... 525/125, 130, 194, 223, 525/108, 118

[56] References Cited

U.S. PATENT DOCUMENTS

| | | | |
|---|---|---|---|
| 4,619,969 | 10/1986 | Doi | 525/194 |
| 4,883,837 | 11/1989 | Zabrocki | 525/125 |
| 5,169,899 | 12/1992 | Uehara | 525/66 |
| 5,183,860 | 2/1993 | Kashihara | 525/452 |

FOREIGN PATENT DOCUMENTS 77684 9/1983 Finland .
056442 3/1984 Japan .
007346 1/1986 Japan .................................. 525/125

*Primary Examiner*—David Buttner
*Attorney, Agent, or Firm*—Armstrong, Westerman, Hattori, McLeland & Naughton

[57] ABSTRACT

The invention relates to a thermoplastic elastomer composition comprising a) a polyolefin and b) a crosslinked ethylene copolymer, the crosslinks between the main chains of the molecules of which have been formed of the hetero groups of at least two comonomer units being in different main chains and at least two hetero groups of the crosslinking-agent molecule being chemically attached to each other. The problem of such a mixture is that the lipophilic thermoplastic polyolefin and the ethylene copolymer to be crosslinked with its polar hetero groups are not compatible. Now, the problem has been solved by forming the crosslinks between the main chains so that either the hetero group of the comonomer unit in the main chain or then the hetero group of the crosslinking agent molecule always is a hydroxyl group, the hydroxyl group always forming a permanent oxygen crosslink bond with the other hetero group attached to it.

9 Claims, No Drawings

DYNAMICALLY CROSSLINKED POLYOLEFIN COMPOSITION the invention related to a thermoplastic elastomer composition comprising a) a polyolefin and b) a crosslinked ethylene copolymer, the crosslinks between the stem chains of the molecules of which have been formed of the hetero groups of at least two comonomer units being in different stem chains and at least two hetero groups of the crosslinking-agent molecules being chemically attached to each other. By a hetero group is meant in this context a functional group containing at least one hetero atom i.e. a non-carbon atom.

In the 1970's many companies delivering polypropylene and ethylene propylene rubber began to market mixtures of these two polymers. There were available such mixtures in various compositions so that in one extreme end there were materials like polypropylene, but a little tougher and better cold-resistant, and in the other extreme end there were more rubber resembling materials. Although the last-mentioned materials were not vulcanized, their elasticity was very reversible and as the reason was regarded that the short propylene segments of the ethylene propylene rubber had crystallized together with the segments of the polypropylene molecules so that the crystalline areas were acting as crosslinkers.

These mixture rubbers are very desirable because of their moderate price, their weather-resistance, their non-toxicity and because they are easy to process and easy to reprocess, for which reason they have often been used e.g. in the car industry among other things as the decorating shield of the cooler, the border of the headlights, the fender of the buffer, the panel of the instrument board and the sealing of the door. They have also been used as the insulator of cables. In some applications it has been difficult to decide whether these materials belong to rubbers or thermoplastics. Nowadays, they form a new category of materials and belong to thermoplastic elastomers (TPE).

Later on one has began to chemically modify mixtures based on polyolefins and ethylene-based rubber so that the rubber component of the mixture has been crosslinked. The mixtures still are thermoplastic because the crosslinked ethylene-based elastomer is in dispersed state in regard to the thermoplastic polyolefin plastic, such as polypropylene. The polyolefin hereby forms a continuous phase and the ethylene-based crosslinked rubber, which is a copolymer of ethylene and one or several crosslinkable comonomers, forms a phase dispersed to the continuous phase. In this manner elastomeric properties are achieved, if the dis- persed crosslinked phase is soft enough, by retaining simultaneously the thermoplastic properties of the material, whereby they can be processed by the processing methods of thermoplastics.

Interesting thermoplastic mixtures of this kind have been prepared among others by Monsanto, Mitsui Petrochemicals and Mitsubishi Petrochemicals. When polypropylene (PP) has been used as a continuous phase, ethylene propylene diene terpolymer (EPDM) has usually been used as the dispersed phase and the unsaturated groups of the last-mentioned have been made to crosslink by different kinds of vulcanizing methods by using e.g. sulphur or various kinds of sulphur compounds. Other rubber qualities, such as nitrile rubber, have also been used as the dispersed phase, but the crosslinking has always been achieved by the conventional vulcanization methods of rubbers.

The properties of a thermoplastic mixture are greatly affected by the manner in which the crosslinking has physically and chemically been achieved. One very important and usable crosslinking method is the so-called dynamic crosslinking, which is carried out by reacting the ethylene copolymer to be crosslinked with the crosslinking agent in a melt-mixing machine or a kneader. As already mentioned the ethylene copolymer-based elastomer component of a thermoplastic mixture has generally been crosslinked by the conventional vulcanization methods of rubbers. The crosslinking has also been achieved so that the ethylene copolymer to be crosslinked has been furnished with reactive groups which are then joined together by the aid of some difunctional crosslinking agent. Hereby, the problem is that the lipophilic thermoplastic polyolefin and the ethylene copolymer to be crosslinked with its polar reactive hetero groups are not compatible. This can be seen, except in the bad dispersion degree, in that the mechanical properties of the thermoelastic mixture created are unsatisfactory.

In the EP application 279,026 a thermoelastic mixture is presented which comprises:

A) 15 to 75 weight parts of crystalline polyolefin based on ethylene and/or propylene, and B) 25 to 85 weight parts of crosslinked ethylene alkyl acrylate elastomer prepared by dynamically crosslinking terpolymer formed by ethylene, alkyl acrylate and a monoalkyl ester of 1,4-butene diacid. A dynamic crosslinking is carried out by mixing and kneading elastomeric ethylene alkylacrylate copolymer having repeating units of 1,4-butene diacid as crosslinking points with a crosslinking agent, which according to the publication can be diamine, polyamine or some preform of them.

Attempts have been made to improve the compatibility of the components of the above-mentioned thermoplastic mixture by using ethylene alkylacrylate copolymer modified with 1,4-butene diacid as the crosslinked ethylene copolymer and as the crosslinking agent at least 2-functional amine.

A disadvantage of a primary amine group is, however, that when it reacts with a carboxyl group it retains one of its hydrogens, which then later is in strong interaction with the surrounding. Among others the high processing temperatures and the great hydrophobicity of the polyamides are resulting from this. The use of diamines as the crosslinking agent of the ethylene copolymer to be crosslinked leads inevitably to compatibility problems between the thermoplastic polyolefin component and the crosslinked ethylene copolymer, which are due to the lipophilicity of the polyolefin and the hydrophilicity of the amide groups present in the ethylene copolymer.

An aim of the present invention is to provide a thermoelastic mixture, the components of which are as compatible with each other as possible. Moreover, a mixture easy to process is aimed at, which is stabile, has suitable rheology and usable melting and softening points. Further aims are good mechanical properties, good weather resistance, non-toxicity and resistance to chemicals.

The above-defined aims have now been reached by the new thermoelastic mixture, which is mainly characterized by what is stated in the characterizing clause of claim 1. As has been stated above, a crosslinked ethylene copolymer is used as the elastomer component of the thermoelastic mixture, the links between the main chains of the molecules of which have been formed when two hetero groups of the comonomer unit in different main chains and two hetero groups of the crosslinking agent molecule are chemically attached to each other. It has now been realized that the hetero groups participating in the formation of the link influence essentially the properties of the products. According to the invention the crosslinks have been formed so that either the hetero group of the comonomer unit in the main chain or then the hetero group of the crosslinking agent molecule always is a hydroxyl group, the hydroxyl group always forming a permanent oxygen crosslink bond with the other hetero group attached to it.

The olefin used in the thermoelastic mixture according to the invention preferably is a crystalline polyolefin. Polyethylene, polypropylene or their copolymer can be mentioned as examples of usable crystalline polyolefins. They can also contain minor amounts of units of higher alphaolefins or other ethylenically unsaturated comonomers. The most preferable polyolefin is polypropylene, which gives the thermoelastic mixture usable properties, such as a high heat resistance.

Accordingly, the present invention is based on carrying out the crosslinking so that one of the hetero groups of the reacting hetero group pairs always is a hydroxyl group. When the hydroxyl group reacts an oxygen crosslink is formed which is not as lipophobic as e.g. an amino group. Accordingly, the present invention has by nature two main embodiments: one, in which the hetero group of the comonomer unit being in the main chain of the crosslinked ethylene polymer is a hydroxyl group, and the other, in which the hetero group of the crosslinking agent molecule is a hydroxyl group. The main chain can, of course, comprise both hydroxyl groups and groups reacting with them, whereby it is simultaneously used either such a bifunctional crosslinking agent mixture, one of the crosslinking agents of which has one or two hydroxyl groups, or such a crosslinking agent that only comprises one hydroxyl group and another group reacting with the hydroxyl group. The main thing is that the crosslinking takes place through a reaction with the hydroxyl group.

When the hetero groups of the monomer unit of the crosslinked ethylene copolymer are hydroxyl groups, they have been included in the polymer by copolymerizing, grafting or any other manner. They can be attached to the polymer chain by using e.g. hydroxy alkyacrylate as the comonomer in the polymerization of high pressure polyethylene or then the ethylene vinylacetate copolymer can be partly or totally hydrolyzed so that the vinylacetate repeating unit is transformed to a vinylalcohol repeating unit. Also allyl alcohol can be thought of as a comonomer and the comonomers can also be grafted to ethylene copolymers. According to one preferred embodiment the comonomer unit furnished with a hetero group of an ethylene copolymer is a hydroxy ethylacrylate or hydroxyethyl methacrylate unit.

The ethylene copolymer can be any ethylene copolymer that can be transformed elastomeric by modifying. Among such ethylene copolymers are e.g. ethylene propylene copolymers and ethylene acryl copolymers. Moreover, the ethylene copolymer chain can comprise other comonomers, such as vinylacetate and alkylacrylate, which decrease the crystallinity of the dispersed phase.

According to one preferred embodiment the crosslinked ethylene copolymer is a copolymer of ethylene and hydroxyethyl methacrylate. Such an elastomer component gives maximal strength, when the thermoelastic mixture is dynamically crosslinked and is simultaneously melt-processed to a form body. If the melt-processing is wanted to be facilitated a terpolymer of ethylene, vinylacetate and hydroxyethyl methacrylate can be used as the crosslinked ethylene copolymer component. The vinylacetate component of terpolymer makes the melt-processing easier and gives the product a softer elasticity.

When the hetero group of the comonomer unit of the crosslinked ethylene copolymer is a hydroxyl group, the hetero groups of the crosslinking-agent molecule can be selected among others from the following groups:

carboxylic acid group halide of carboxylic acid, such as a carboxyl chloride group anhydride group of carboxylic acid ester group of carboxylic acid lactone group (e.g. caprolactone group)

alkylene oxide group, such as ethylene or propylene oxide group silicon halide group or silicon alkoxide group glycidyl ether group epihalohydrine group carbonate group ketene group and isocyanate group.

Among particularly preferable hetero groups of crosslinking-agent molecules are the carboxyl group, carboxylic acid anhydride group, isocyanate group and glycidyl ether group.

The crosslinking agent can be a crosslinking agent having in its both ends groups of the kind mentioned reacting with the hydroxyl group. The groups can be similar or of different kind. The crosslinking agent can also be such as to its structure that it has in its one end a hydroxyl group and in the other end a group of the kind mentioned reacting with the hydroxyl group. A condition for the producing of the crosslinking is hereby that the main chains of the ethylene copolymer to be crosslinked comprise both hydroxyl groups and groups reacting with the hydroxyl groups. Such a mixing of groups does not represent a preferred embodiment because the risk is that the main chain and the crosslinking agent react with themselves and form rings, oligomers and polymers. Accordingly, it is preferable if there is a group of the kind mentioned reacting with the hydroxyl group in both ends of the crosslinking agent.

According to one preferred embodiment the crosslinking agent is di-isocyanate. Among such usable isocyanates are the toluene di-isocyanate (TDI) and diphenylmethane diisocyanate (MDI) known from the preparation of polyurethanes. Commercial products of these are e.g. the 80:20 and 65:35 mixtures (80:20 TDI, 65:35 TDI) of 2,4-toluene di-isocyanate and 2,6-toluene di-isocyanate. Diphenylmethane di-isocyanate i.e. MDI is also a commercial mixture of various, mainly two-functional di-isocyanates. Commercially available are also naphthalene di-isocyanate and hexamethylene di-isocyanate including its derivatives and triphenylmethane-pp'p"triyl-tri-isocyanate. Although the last-mentioned is trifunctional i.e. it has three reactive isocyanate groups, it is suitable for some aims according to the invention. In the crosslinking reaction according to the invention the isocyanates react heavily with the hydroxyl groups of the crosslinkable ethylene copolymer and mainly form urethane groups.

The crosslinking agent can also be formed by a polyether or polyester-based polyurethane prepolymer with isocyanate ends. When preparing polyurethane prepolymers polyether with hydroxyl ends, e.g. polyethylene glycol, or polyester with hydroxyl ends, e.g. a condensation product of propylene glycol and adipine acid, is first provided. Then this product is reacted with di-isocyanate, whereby it gets the di-isocyanate end groups. This kind of a reactive prepolymer is very suitable for a crosslinking agent in the present invention.

When the ethylene copolymer to be crosslinked contains hydroxyls, dicarboxylic acid can also be a preferred crosslinking agent. The dicarboxylic acids can be acids with the formula $HOOC-C_nH_m-COOH$. The simpliest dicarboxylic acids are the oxalic, malone, succinic and adipine acids (saturated dicarboxylic acids), maleic and sorbine acids (unsaturated aliphatic dicarboxylic acids) and phthalic and terephthalic acids (aromatic dicarboxylic acids). The most preferable dicarboxylic acids are the saturated acids, such as malone acid or methyl succinic acid.

Instead of acid also reactive acid derivatives can be used, such as acid anhydrides or acid chlorides. When the acid chlorides are unfavourable, because they release hydrogen chloride in the crosslinking reaction, the acid anhydrides are much more handy and reactive. Among typical crosslinkable acid anhydrides are phthalic acid anhydride, hexahydrophthalic acid anhydride, maleic acid anhydride, pyromellitic acid anhydride, trimellitic acid anhydride, and so-called "nadic anhydride". The functionality of some of them is greater than two, but they are still suitable as crosslinking agents.

When the ethylene copolymer to be crosslinked contains hydroxyl groups the crosslinking agent can also be diglycidyl ether with small or greater molecules. Be ethylene glycol diglycidyl ether and diethylene glycol diglycidyl ether mentioned from diglycidyl ethers with small molecules. From diglycidyl ethers with greater molecules can bisphenol-A- and polyaromatic diglycidyl ethers of novolacquer type be mentioned.

Whereas above the embodiment has been dealt with in which the crosslinks between the main chains of the molecules of the ethylene copolymer to be crosslinked have been formed when the hydroxyl group and the hetero group reacting with the hydroxyl group of the crosslinking-agent molecules join to each other, in the following the embodiment of the invention is being dealt with, in which one or several hetero groups of the crosslinking-agent molecules are hydroxyl groups and there are in the main chain of the ethylene copolymer to be crosslinked one or several hetero groups reacting with the hydroxyl group mentioned. Accordingly, an embodiment is being dealt with, in which either one or both of the hetero groups are hydroxyl groups.

It is particularly advantageous if at least two functional hetero groups of the crosslinking agent are hydroxyl groups i.e. it is at least a glycol. The glycol can be one having smaller or greater molecules. Be ethylene glycol and diethylene glycol mentioned of glycols with smaller molecules. For some purposes triols, such as glycerol or its derivatives, or tetraols, such as pentaerythritols and its derivatives, can be used as crosslinking agents. Of glycol crosslinking agents with great molecules may hydroxyl-ended lower alkyl ethers, such as polyethylene glycols and hydroxyl-ended polyesters, such as condensation products of smaller glycols and dicarboxylic acids, be mentioned.

When the crosslinked agent is glycol or respective, the hetero group of the comonomer unit of the ethylene copolymer to be crosslinked can be any of the above-mentioned hetero groups, which were listed as possible hetero groups of the crosslinking agent, when a hydroxyl-containing ethylene copolymer to be crosslinked was in question. Among preferred hetero groups of a comonomer unit count e.g. the carboxylic group and the glycidyl ether group.

The mentioned hetero groups reacting with the hydroxyl groups can be provided to the ethylene copolymer to be crosslinked and reacting with the crosslinking agent hydroxyls either by grafting, copolymerizing or reacting in some other way. As mentioned above, the ethylene copolymer chain can comprise units of other comohomers, such as vinyl acetate and alkyl acrylate, which decrease the crystallinity of the dispersed phase. A particularly advantageous ethylene copolymer to be crosslinked is the copolymer of ethylene and acrylic acid. Suitable is also the terpolymer of ethylene, ethyl acrylate and glycidyl methacrylate.

Although the thermoelastic mixture according to the present invention can be prepared in any way, it is advantageous to prepare it by melt-alloying a mixture of polyolefin, the ethylene copolymer to be crosslinked and the crosslinking agent so that the polyolefin forms a continuous phase, dispersed to which is a crosslinked ethylene copolymer crosslinked with the crosslinking agent. This kind of crosslinking taking place in connection with melt-alloying is called dynamic crosslinking. When a thermoelastic mixture according to the invention is alloyed it is advantageous to add to the ethylene copolymer to be crosslinked softeners or soft polymers, which reduce its crystallinity degree. Typical plasticizers are polyalphaolefin oil, ethylene propylene oil, polyisobutene oil and conventional ester plasticizers. Typical soft polymers are ethylene vinyl acetate copolymer, ethylenebutyl acrylate copolymer, ethylene propylene rubber, nitrile rubber, etc.

The melt-alloying and preferably dynamic melt-alloying preferably takes place in a melt-mixer, such as a Brabender or Banbury mixer, a twin screw extruder or in a kneader, such a Haake or Bus-Ko kneader. The mixture is preferably prepared at a temperature of 150° to 200° C. The concentration of the mixture according to the invention preferably is such that it contains 5 to 95, preferably 15 to 75% by weight, of the polyolefin mentioned and 5 to 95, preferably 15 to 75% by weight, of crosslinked ethylene copolymer.

In order to illustrate the technology forming the object of the invention the following, non-restrictive examples are presented:

EXAMPLES 1 TO 5

To a Haake kneader was added polypropylene (PP, Neste's VA 7050 K homopolymer, MI=0.7) and ethylene hydroxyethylmethacrylate copolymer (EHEMA, Neste's NCPE 0460, 8.0% of hydroxyethyl methacrylate, MI=10) the temperature being 180° C. and the rotational velocity of the rotors 100 rpm. When the agitation had gone on for 3 minutes, diphenylmethane di-isocyanate (MDI, Dow Chemical's Voranate M 229), was added as crosslinking agent and the agitation was continued a further 5 min. In this way the mixture was crosslinked dynamically. The material portions of the tests are presented in Table 1. ASTM is an abbreviation of the American test standard used.

TABLE 1

Materials and material portions used in examples 1 to 5

| Example | Polymer mixture | | Crosslinking agent |
|---|---|---|---|
| | PP (% by wt) | EHEMA (% by wt) | MDI (g) |
| 1 | 20 | 80 | — |
| 2 | 20 | 80 | 0.6 |
| 3 | 20 | 80 | 1.8 |
| 4 | 30 | 70 | 1.8 |
| 5 | 40 | 60 | 1.8 |

PP = polypropylene
EHEMA = ethylene hydroxyethyl methacrylate copolymer
MDI = diphenyl methane di-isocyanate From the above-mentioned mixtures obtained sheets with the thickness of 2 mm were compressed (175° C), the properties of which were tested.

TABLE 2

The hardness and elongation obtained

| Example | Crosslinking degree of the dispersed phase (ASTM D-2765) (%) | Shore D-hardness (ASTM D-2240) | Permanent elongation (ASTM D-412) |
|---|---|---|---|
| 1 | 0 | 43 | 82 |
| 2 | 40 | 46 | 47 |
| 3 | 65 | 45 | 39 |
| 4 | 57 | 45 | 51 |
| 5 | 53 | 50 | 67 |

EXAMPLES 6 TO 10

In addition to MDI also other crosslinking agents were tested, such as Dow Chemicals'es polyurethane based on MDI Isonate M 340, malonic acid, methyl succinic acid, phthalic acid anhydride, trimellitic anhydride, and ethyleneglycol diglycidyl ether. The substances and substance portions used are presented in Table 3.

TABLE 3

The materials and material portions used in examples 6 to 11

| Example | Polymer mixture | | Crosslinking agent (g) |
|---|---|---|---|
| | PP (% by wt.) | EHEMA (% by wt.) | |
| 6 | 20 | 80 | Isonate M 340, 0.6 |
| 7 | 20 | 80 | Malonic acid, 1.6 |
| 8 | 20 | 80 | Methyl succinic acid, 2.0 |
| 9 | 20 | 80 | Phthalic acid anhydride, 2.3 |
| 10 | 20 | 80 | Trimellitic anhydride, 2.0 |
| 11 | 20 | 80 | Ethyleneglycol diglycidyl ether, 2.7 |

PP = polypropylene
EHEMA = ethylene hydroxyethylmethacrylate copolymer

The above-mentioned mixtures were tested in the same manner as in examples 1 to 5. The results are presented in Table 4.

TABLE 4

Results obtained from Examples 6 to 11

| Example | Crosslinking degree of the dispersed phase (%) (ASTM D-2765) | Shore A hardness (ASTM D-2240) | Permanent elongation (%) (ASTM D-412) |
|---|---|---|---|
| 6 | 53 | 92 | 27 |
| 7 | 64 | 92 | 37 |
| 8 | 42 | 87 | 41 |
| 9 | 46 | 88 | 36 |
| 10 | 76 | 94 | 47 |
| 11 | 38 | 82 | 38 |

EXAMPLES 12 TO 18

In order to obtain softer dynamically crosslinked polyolefin mixtures, comonomer can be added to a continuous phase (Neste random-copolymer XB 6050 B, MI=6, ethylene=3.0%) or to a dispersed phase (Neste ethylene vinylacetate hydroxyethylmethacrylate terpolymer, EVAHEMA NCPE 0469, MI=3, VA=8.5, HEMA=8.5%). Also soft polymers (EVA, Neste NCPE 5428, MI 335, VA=28% or EBA, Neste NTR-359, MI=25, BA=35%) or liquid softeners (Neste polyalphaolefin oil, PAO, PP 10.1/h1, Neste ethylene propylene oil, EP, UR 66 and the polyisobutylene oil of BP Chemicals, PIB, Hyvis 10) can be mixed with the dispersed phase.

The substances and substance portions used in the examples are presented in Tables 5 and 6

TABLE 5

Material portions used in examples 12 to 14.

| Example | Polymer mixture | | | Crosslinking agent MDI (g) |
|---|---|---|---|---|
| | Continuous phase (% by wt.) | Dispersed phase (% by wt.) | Additive (% by wt.) | |
| 12 | PP copol., 20 | EHEMA, 80 | — | 0.4 |
| 13 | PP homop., 20 | EVAHEMA, 80 | — | 0.3 |
| 14 | PP homop., 20 | EVAHEMA, 40 | EVA, 40 | 0.2 |

EVAHEMA: ethylene vinylacetate hydroxyethyl methacrylate copolymer
EVA = ethylene vinylacetate copolymer
MDI = di-phenyl methane di-isocyanate

TABLE 6

The material used in examples 15 to 18 and their portions

| Example | Polymer mixture | | | Crosslinking agent MDI (g) |
|---|---|---|---|---|
| | Continuous phase (% by wt.) | Dispersed phase (% by wt.) | Additive (% by wt.) | |
| 15 | PP-homop., 20 | EHEMA, 40 | EBA, 40 | 0.3 |
| 16 | PP-homop., 18 | EHEMA, 78 | PAO, 4 | 0.4 |
| 17 | PP-homop., 18 | EHEMA, 78 | EP, 4 | 0.4 |

TABLE 6-continued

The material used in examples 15 to 18 and their portions

| Example | Continuous phase (% by wt.) | Polymer mixture | | Crosslinking agent MDI (g) |
| | | Dispersed phase (% by wt.) | Additive (% by wt.) | |
| --- | --- | --- | --- | --- |
| 18 | PP-homop., 18 | EHEMA, 78 | PIB, 4 | 0.4 |

EBA = ethylene butylacrylate copolymer
PAO = polyalphaolefin oil
EP = ethylene propylene oil
PIB = polyisobutylene oil The above-mentioned mixtures were tested in the same manner as in examples 2. The results are presented in Table 7.

TABLE 7

Test results of examples 12 to 18

| Example | Crosslinking degree of the dispersed phase (%) (ASTM D-2765) | Shore A- hardness (ASTM D-2240) | Permanent elongation (%) (ASTM D-412) |
| --- | --- | --- | --- |
| 12 | 57 | 92 | 27 |
| 13 | 29 | 88 | 31 |
| 14 | 25 | 83 | 37 |
| 15 | 36 | 84 | 32 |
| 16 | 3.0 | 90 | 76 |
| 17 | 4.7 | 91 | 71 |
| 18 | 4.4 | 91 | 69 |

EXAMPLES 19 AND 20

Also other than hydroxyl functional polymers can be used as the dispersed phase, e.g. ethylene acrylic acid copolymer (EAA, Dow Chemical's Primacor 1410, AA=9%, MI=1.5) or ethylene ethylacrylate glycidylmethacrylate terpolymer (E-EA-GMA, Atochem's Lotader AX 8660, EA=33%, GMA=8%, MI=6). Hereby the hydroxyl functionality is in the crosslinking agent. The substances and substance portions used in the examples are presented in Table 8.

TABLE 8

The substances and substance portions used in the examples 19 and 20.

| Example | Continuous phase (% by wt.) | Polymer mixture | Crosslinking agent ethylene glycol (g) |
| | | Dispersed phase (% by wt.) | |
| --- | --- | --- | --- |
| 19 | PP-homop., 20 | EAA, 80 | 3 |
| 20 | PP-homop., 20 | E-EA-GMA, 80 | 3 |

PP = polypropylene
EAA = ethylene acrylic acid copolymer
AA = acrylic acid
E-EA-GMA = ethylene ethylacrylate glycidyl methacrylate copolymer

TABLE 9

Test results of the examples 19 and 20

| Example | Crosslinking degree (%) | Shore A hardness | Permanent elongation (%) |
| --- | --- | --- | --- |
| 19 | 51 | 96 | 42 |
| 20 | 43 | 46 | 24 |

What is claimed is:

1. A thermoelastic composition comprising
   (A) 5 to 95% by weight of crystalline polyolefin selected from the group consisting of polyethylene, polypropylene and crystalline ethylene/propylene copolymers and
   (B) 95 to 5% by weight of a crosslinked ethylene copolymer formed by the crosslinking reaction of a copolymer of ethylene selected from the group consisting of
   (1) a copolymer of ethylene and hydroxyethyl acrylate,
   (2) a copolymer of ethylene and hydroxyethyl methacrylate, and
   (3) a copolymer of ethylene, vinyl acetate and hydroxyethyl methacrylate, with a crosslinking agent selected from the group consisting of
      (i) toluene diisocyanate, diphenylmethane diisocyanate, naphthalene diisocyanate and hexamethylene diisocyanate,
      (ii) oxalic acid, malonic acid, succinic acid, methylsuccinic acid, adipic acid, maleic acid, phthalic acid and terephthalic acid,
      (iii) phthalic anhydride, hexahydrophthalic anhydride, maleic anhydride, pyrometllitic anhydride, trimellitic anhydride and nadic anhydride, and
      iv) ethylene glycol diglycidyl ether, diethylene glycol diglycidyl ether and bisphenol A diglycidyl ether and novolac polyaromatic diglycidyl ethers.

2. A thermoelastic composition according to claim 1, wherein the crosslinking agent is toluene diisocyanante or diphenylmethane diisocyanate.

3. A thermoelastic composition according to claim 1, wherein the crosslinking agent is malonic acid or methylsuccinic acid.

4. A thermoelastic composition according to claim 1, wherein the crosslinking agent is phthalic anhydride or trimellitic anhydride.

5. A thermoelastic composition according to claim 1, wherein the crosslinking agent is ethylene glycol glycidyl ether.

6. A thermoelastic composition according to claim 1, which is prepared by melt-alloying a mixture of the crystalline polyolefin, the ethylene copolymer and the crosslinking agent, and wherein the pololefin forms a continuous phase in the crosslinked ethylene copolymer.

7. A thermoelastic composition according to claim 6, which is prepared by kneading.

8. A thermoelastic composition according to claim 7, which is prepared at a temperature of 150° to 200° C.

9. A thermoelastic composition according to claim 1, wherein the crosslinked ethylene copolymer contains softeners or soft polymers, which decrease its crystallinity.

* * * * *